Patented Dec. 23, 1952

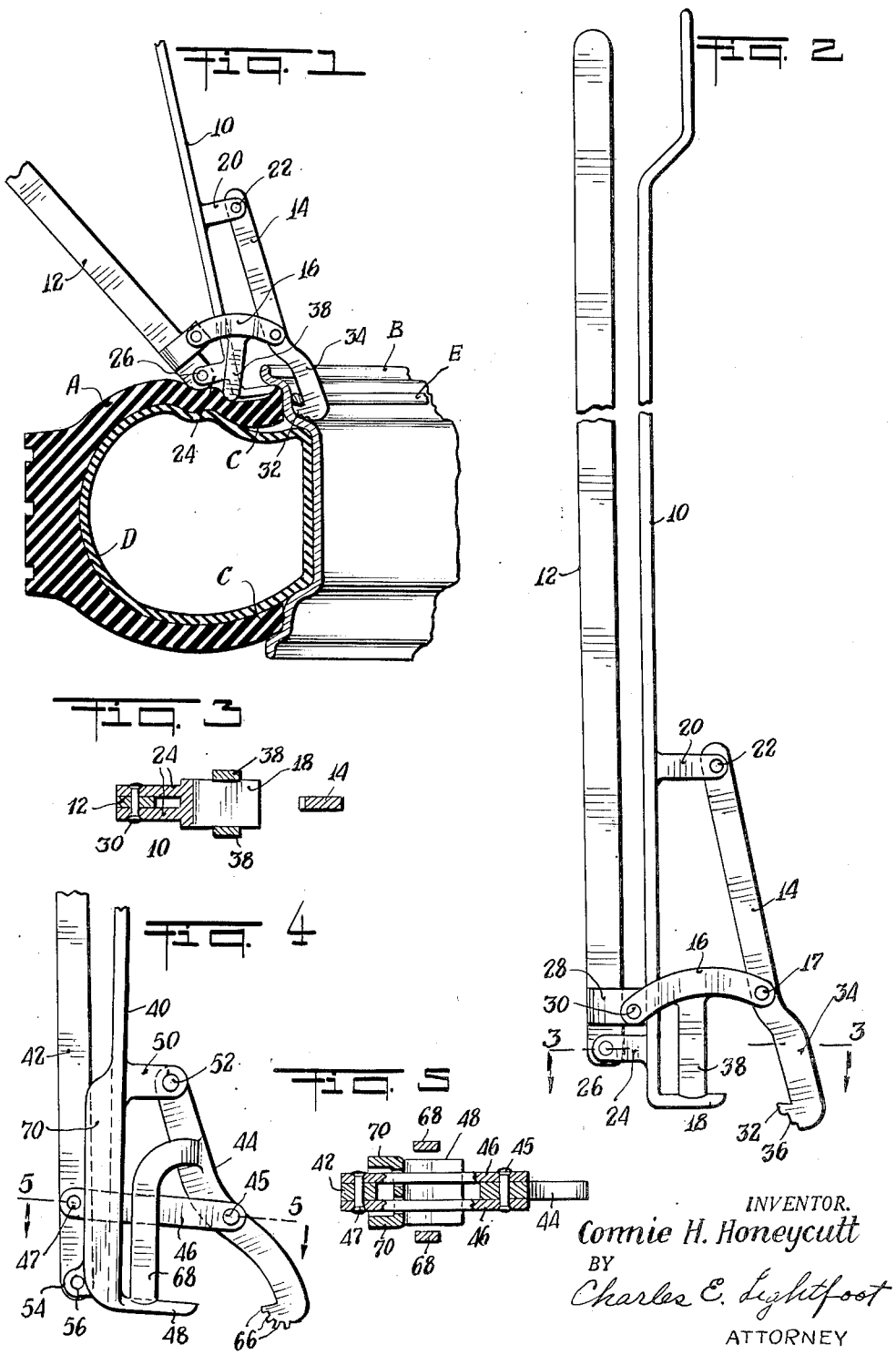

2,622,665

UNITED STATES PATENT OFFICE 2,622,665

LEVER ACTUATED TIRE BEAD LOOSENING TOOL

Connie H. Honeycutt, Houston, Tex.

Application June 19, 1950, Serial No. 169,028

1 Claim. (Cl. 157—1.17)

This invention relates to a lever actuated tire bead loosening tool and more particularly to a tool adapted for use in loosening the beads of vehicle tires from the rims of the wheels to facilitate the removal of the tires from the rims.

While not limited to such use the invention finds particular application in the removal of tires of large size from the wheels of trucks or other vehicles for purposes of repair or for other reasons. The tires customarily used on motor vehicles are usually provided with circumferential beads for engagement with the rim of the wheel on which the tire is mounted, and in attempting to remove such tires it is usually found that the beads are firmly stuck to the rim. Under these circumstances, pounding on the sides of the tire with a hammer or other heavy implement is frequently resorted to, which may result in serious injury to the fabric of the tire, and is hazardous to the operator, as well as being a very difficult and time consuming procedure. In the case of tires of large size an excessive amount of labor and time is consumed in the conventional method of removing the same from the rims.

It is an important object of this invention, therefore, to provide a tire removing tool whereby tires may be readily loosened from the rims preparatory to removal of the same therefrom.

Another object of the invention is the provision of a tire removing tool which is cooperable with the rim to firmly grip the rim and by which pressure may be applied to the wall of the tire to loosen the bead of the tire from the rim.

A further object of the invention is to provide a tool for removing vehicle tires from their rims, which is adapted for use with tires of any size and by which the tire can be loosened from the rim without injury to the wall or bead of the tire and without excessive effort on the part of the operator.

Another object of the invention is the provision of a tire removing tool of the type referred to having gripping means adapted to be engaged with the rim to hold the tool in position for operation on the tire, and also having tire engaging means by which pressure may be exerted on the wall of the tire to effectively loosen the bead from the rim without damaging the tire.

A still further object of the invention is to provide a tool for removing vehicle tires from their rims, which is simple in design and strong in structure, whereby the same is capable of withstanding the rough usage to which such a device is likely to be subjected.

The above and other objects and advantages of the invention will best be understood from the following detailed description constituting a specification of the same when taken in conjunction with the annexed drawings, wherein—

Figure 1 is a fragmentary side elevational view of the invention, showing the manner in which the same is applied to a rim to remove the tire therefrom;

Figure 2 is a side elevational view of the invention;

Figure 3 is a cross-sectional view taken along the line 3—3 of Figure 2;

Figure 4 is a fragmentary side elevational view of a slightly modified form of the invention; and Figure 5 is a cross-sectional view taken along line 5—5 of Figure 4.

In Figure 1 of the drawings the invention is shown in its application to the loosening and removal of a tire indicated at A from a rim B, the tire having bead portions C engaging the outer periphery of the rim and held thereon by an inflatable inner tube D. The rim B may be of a type having a locking ring of conventional structure generally indicated at E.

The invention in its preferred embodiment as illustrated in Figures 1, 2 and 3, comprises essentially a supporting member in the form of a shaft 10, a lever 12 pivotally secured at its lower end to the supporting member, a rim engaging member or hook 14 pivotally supported on the member 10 and pivotally connected by hook operating links 16 to the lever 12 by a pin 17 and tire engaging means in the form of a cam or foot-piece 18 on the supporting member opposing the hook.

The supporting member or shaft 10 may have spaced lugs 20 mediate its ends between which the upper end of the hook member 14 is pivoted by a pin 22. Similar spaced lugs 24 may project from the opposite side of the lever 10 spaced somewhat above the tire engaging member or foot-piece 18 thereof, between which lugs the lever 12 is pivoted at its lower end by a pin 26.

Spaced lugs 28 are also provided on the lever 12 above the lower end thereof for the pivotal attachment of hook operating links 16 thereto by a pin 30, and the links are pivotally secured to the member 14 above the hook 32 thereon. An offset portion 34 may be formed on the lower end of the member 14 for a purpose later to be made apparent.

Hook 32 may also have teeth 36 on its outer rounded portion which teeth may engage a surface portion of a rim to prevent slipping of the hook thereon.

Downwardly extending tire engaging lugs 38 depend from the hook operating links 16 on opposite sides of the tire engaging foot-piece or cam 18 for engagement with the wall of the tire when the tool is being used.

In Figures 4 and 5 there is illustrated a slightly modified form of the invention, wherein the tool is constructed with a supporting member in the form of a shaft 40 and a lever 42, which are of similar structure to the supporting member 10 and lever 12, respectively, previously described, and similarly pivoted together adjacent their lower ends. A rim-engaging hook member 44 is pivotally supported on member 40 and connected by hook operating links 46 to the lever 42, and a tire engaging cam or foot-piece 48 on the lower end of supporting member 40 opposes the hook. Lugs 50 extend from the supporting member 40 mediate its ends, between which lugs the hook member 44 is pivoted by a pin 52, and similar lugs 54 are provided at the opposite side of member 40 adjacent the foot-piece 48 between which the lever 42 is pivoted at its lower end by a pin 56.

The links 46 are pivoted directly to the lever 42 above the lower end thereof by a pin 47, and to the hook member by a pin 45.

Hook member 44 has an offset portion, and the hook 62 thereon may have teeth 66 on its outer rounded portion. From each side of the hook member mediate its ends a downturned lug 68 extends, these lugs being disposed outside of the links 46 and on each side of the foot-piece 48.

At its lower end, the member 40 has re-enforcing side flanges 70 extending for some distance above the cam or foot-piece 48, forming a channel portion open toward the lever 42, and into which the lower end portion of lever 42 may move when supporting member and lever are moved toward each other.

The invention is used in the manner illustrated in Figure 1, both forms of the invention being applied and operated in a similar way. To loosen or "break" the bead of the tire from the rim, the member 10 and lever 12 are swung toward each other to the positions seen in Figure 2, the hook 32 is engaged beneath the locking ring E of the rim, and the cam or foot-piece 18 is pressed against the wall of the tire outside the rim. By swinging the supporting member and lever apart the cam or foot-piece may then be forced between the bead of the tire and the rim as shown in Figure 1, and by rocking the tool from side to side in this position, the bead may be forced inwardly away from the rim and loosened therefrom. This operation may be repeated as often as necessary at various points about the rim, sliding the tool about the periphery of the rim, or releasing the tool and re-engaging the same as may be required, until the entire bead has been loosened. The loosening operation may then be repeated on the opposite side of the rim by turning the same over and the other bead of the tire similarly loosened. Used in this manner tires of large size may be easily loosened from their rims for ready removal therefrom, with a minimum of effort and a saving of much time, and damage to the rim or the tire resulting from pounding and prying on the same as is customary when ordinary pry-bars or hammers are employed is entirely avoided.

It will be noted that the lugs 38 at each side of the foot-piece 18 engage the wall of the tire when the foot-piece is forced between the bead and rim, and upon rocking of the tool from side to side these lugs press against the tire and are effective to "break" the bead away from the rim at the same time that the cam or foot-piece is similarly functioning. In the form of the invention illustrated in Figures 4 and 5 the lugs 68 engage the wall of the tire and are effective to loosen the tire from the rim in a similar manner to the action of the lugs 38 previously described.

It will be understood that the particular embodiments of the invention shown and described, and the particular procedure set forth, are presented for purposes of explanation only, and that various modifications in the parts and the arrangement of the same can be made, without departing from the invention as defined in the appended claim.

What is claimed as new and desired to secure by Letters Patent is:

A tool for removing a tire from the rim of a vehicle wheel comprising, a support, means on the support engageable with the wall of the tire, a rim-engaging member moveably connected to said support and engageable with the rim, a lever pivotally connected to the support, and link means operatively connected to said lever and said rim-engaging member and cooperable therewith to cause relative movement between said support and member, said link means including means engageable with the wall of the tire at spaced points on said wall.

CONNIE H. HONEYCUTT.

REFERENCES CITED

The following references are of record in the file of this patent:

UNITED STATES PATENTS

| Number | Name | Date |
|---|---|---|
| 1,452,596 | De Fernelmont | Apr. 24, 1923 |
| 2,241,886 | Pearce et al. | May 13, 1941 |
| 2,293,467 | Kenworthy | Aug. 18, 1942 |
| 2,305,886 | Mahler | Dec. 22, 1942 |
| 2,314,127 | Colley et al. | Mar. 16, 1943 |
| 2,319,155 | Passanante et al. | May 11, 1943 |
| 2,402,022 | Corbell | June 11, 1946 |
| 2,501,225 | Kuhlmann | Mar. 21, 1950 |
| 2,509,945 | Strech et al. | May 30, 1950 |
| 2,581,086 | Edenfield et al. | Jan. 1, 1952 |